(12) United States Patent
Hoshikawa

(10) Patent No.: US 9,254,602 B2
(45) Date of Patent: Feb. 9, 2016

(54) INJECTION MOLDING MACHINE INCLUDING POSITION DETECTOR OF DIE OPENING/CLOSING DEVICE

(71) Applicant: FANUC Corporation, Yamanashi (JP)

(72) Inventor: Shintaro Hoshikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/567,322

(22) Filed: Dec. 11, 2014

(65) Prior Publication Data

US 2015/0174805 A1 Jun. 25, 2015

(30) Foreign Application Priority Data

Dec. 20, 2013 (JP) .................................. 2013-264481

(51) Int. Cl.
| | |
|---|---|
| B29C 45/66 | (2006.01) |
| B29C 45/80 | (2006.01) |
| B29C 45/84 | (2006.01) |
| B29C 45/17 | (2006.01) |
| B29C 45/64 | (2006.01) |

(52) U.S. Cl.
CPC ............... *B29C 45/84* (2013.01); *B29C 45/66* (2013.01); *B29C 45/80* (2013.01); *B29C 45/64* (2013.01); *B29C 2045/1797* (2013.01)

(58) Field of Classification Search
CPC ...... B29C 45/66; B29C 45/661; B29C 45/80; B29C 45/83; B29C 2045/1797; B29C 2045/835
See application file for complete search history.

(56) References Cited

U.S. PATENT DOCUMENTS

| | | | | |
|---|---|---|---|---|
| 3,508,300 | A  * | 4/1970 | Allard et al. .................. | 425/107 |
| 3,534,442 | A  * | 10/1970 | Mahle ............................ | 425/150 |
| 5,164,203 | A  * | 11/1992 | Tanaka et al. ................. | 425/149 |
| 6,939,124 | B2 * | 9/2005 | Koch et al. .................... | 425/593 |
| 7,223,084 | B2 * | 5/2007 | Shiozawa et al. ............. | 425/107 |
| 2012/0034330 | A1 | 2/2012 | Fujita et al. | |

FOREIGN PATENT DOCUMENTS

| | | | |
|---|---|---|---|
| DE | 10 2004 042 744 | * | 3/2006 |
| JP | H05-437 | A | 1/1993 |
| JP | 5-16331 | U | 3/1993 |
| JP | 5-278060 | A | 10/1993 |
| JP | 9-103937 | A | 4/1997 |
| JP | 2011-73230 | A | 4/2011 |

OTHER PUBLICATIONS

Office Action mailed Apr. 14, 2015, corresponding to Japanese patent application No. 2013-264481.
Office Action mailed Jun. 23, 2015, corresponding to Japanese patent application No. 2013-264481.

* cited by examiner

*Primary Examiner* — James Mackey
(74) *Attorney, Agent, or Firm* — Hauptman Ham, LLP

(57) ABSTRACT

A position detector detects the position of a die opening/closing device on a machine frame of an injection molding machine. A shielding object is provided between the position detector and an oil scattering source of a mechanical section of the injection molding machine.

3 Claims, 2 Drawing Sheets

INJECTION MOLDING MACHINE INCLUDING POSITION DETECTOR OF DIE OPENING/CLOSING DEVICE

RELATED APPLICATIONS

The present application claims priority to Japanese Application Number 2013-264481, filed Dec. 20, 2013, the disclosure of which is hereby incorporated by reference herein in its entirety.

BACKGROUND OF THE INVENTION

1. Field of the Invention

The present invention relates to an injection molding machine including a position detector of a die opening/closing device.

2. Description of the Related Art

Japanese Patent Application Laid-Open No. 5-437 discloses a technique in which a position detector for detecting a position of a die opening/closing device is provided on a machine frame of an injection molding machine and the die opening/closing device is automatically moved to a position corresponding to the thickness of a die mounted on the injection molding machine. Therefore, a conventional technique will be described with reference to FIG. 3.

A die clamping device is provided on a base 38, a base portion of a front platen (not illustrated) is fixed to the base 38, and a base portion of a rear platen 33 is placed in a rail 39 on the base 38. Here, the die clamping device is movable in the front-to-back direction so as to adjust the thickness of the die. A feeding screw 30 is formed in each of the rear ends of tie-bars 34, and the feeding screws 30 extend backward from the rear platen 33. A tie-bar nut 31 provided with a sprocket attachment is axially supported to the rear surface of the rear platen 33 so as to rotate at the constant position in the axial direction in association with a position where the rear portion of the tie-bar 34 protrudes from the rear surface of the rear platen 33. Then, the tie-bar nut 31 is threaded into the feeding screw 30 formed in the tie-bar 34.

An endless chain is wound around four tie-bar nuts 31 which are threaded into the feeding screws 30 of four tie-bars 34, and the chain is driven by a die thickness adjustment servo-motor 32, so that these four tie-bar nuts 31 rotate in a synchronization state. Accordingly, when the die thickness adjustment servo-motor 32 is driven, the tie-bar nut 31 rotates, and the rear platen 33 moves forward or backward by the pitch of the feeding screw 30. Meanwhile, when the die thickness adjustment servo-motor 32 is stopped, the tie-bar nut 31 does not rotate, and the rear platen 33 is fixed to the current position.

A measurement portion 37a of a linear scale 37 is horizontally fixed to the side surface of the rear platen 33, one end of a bar-shaped scale portion 37b is fixed to one point (a point P) on the base 38, the other end of the scale portion 37b is fitted into the measurement portion 37a, and hence the distance between the point P and one point (for example, an engagement point Q between the rear platen 33 and the tie-bar 34) of the measurement portion 37a is measured. The measurement value obtained from the measurement portion 37a is input to a numerical controller 40 of the injection molding machine. The numerical controller 40 performs a control involving with the injection molding operation, and the memory also stores an operation program in a die thickness adjustment mode. When the die clamping servo-motor 36 is driven, the cross head member 35 of the toggle mechanism moves forward or backward.

Furthermore, there is a case in which a geared motor is used instead of the die thickness adjustment servo-motor. Here, one gear engages with four tie-bar nuts, and the gear is driven by the die thickness adjustment servo-motor or the geared motor.

In the injection molding machine, the position of the die opening/closing device is adjusted in accordance with the thickness of the installed die. The position may be adjusted by a method of moving the die opening/closing device while an operator checks the movement with his/her eyes. However, since the die opening/closing device generally moves at a low speed, it takes a time for the movement, and hence the operator feels burdensome.

In order to solve this problem, according to the conventional technique, a die contact position is searched in a manner such that an injection molding machine automatically moves a die opening/closing device to a position corresponding to the maximum thickness of the die mounted on the injection molding machine and then gradually moves the die opening/closing device in a direction in which the die thickness decreases. However, since the die opening/closing device moves at a low speed, it takes a time for the movement. As a result, there is a disadvantage that a die replacement time increases compared to the case where the position is manually adjusted by the operator.

As a means for solving this problem, Japanese Patent Application Laid-Open No. 5-437 discloses a technique of detecting the position of the die opening/closing device on the machine frame by means of a position detector provided on the machine frame and automatically moving the die opening/closing device to a position corresponding to the thickness of the die mounted on the injection molding machine. According to this technique, the die opening/closing device does not need to be moved to a position corresponding to the maximum thickness of the die mounted on the injection molding machine and the die replacement time maybe shortened compared to the conventional technique.

However, there is a concern that the position detector may be contaminated by the oil scattering from the mechanical section of the injection molding machine such as the die opening/closing mechanism driving ball screw or the push mechanism driving ball screw of the die opening/closing device at the position on the machine frame provided with the die opening/closing device or the position in the vicinity thereof and hence the detection precision may be adversely affected.

SUMMARY OF THE INVENTION

Therefore, the invention is made in view of the problems of the conventional technique, and an object thereof is to provide an injection molding machine capable of preventing a position detector from being contaminated by oil due to the oil scattering from a mechanical section of the injection molding machine.

According to the invention, there is provided an injection molding machine including a position detector detecting a position of a die opening/closing device on a machine frame, wherein a shielding object is provided between the position detector and an oil scattering source of a mechanical section of the injection molding machine.

The shielding object may serve as a bracket for fixing the position detector. Further, the bracket for fixing one of a detection target and a detection piece constituting the position detector may be fixed to a gate rail.

According to the invention, it is possible to provide the injection molding machine capable of preventing the position detector from being contaminated by oil due to the oil scattering from the mechanical section of the injection molding machine.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

Figure 1:
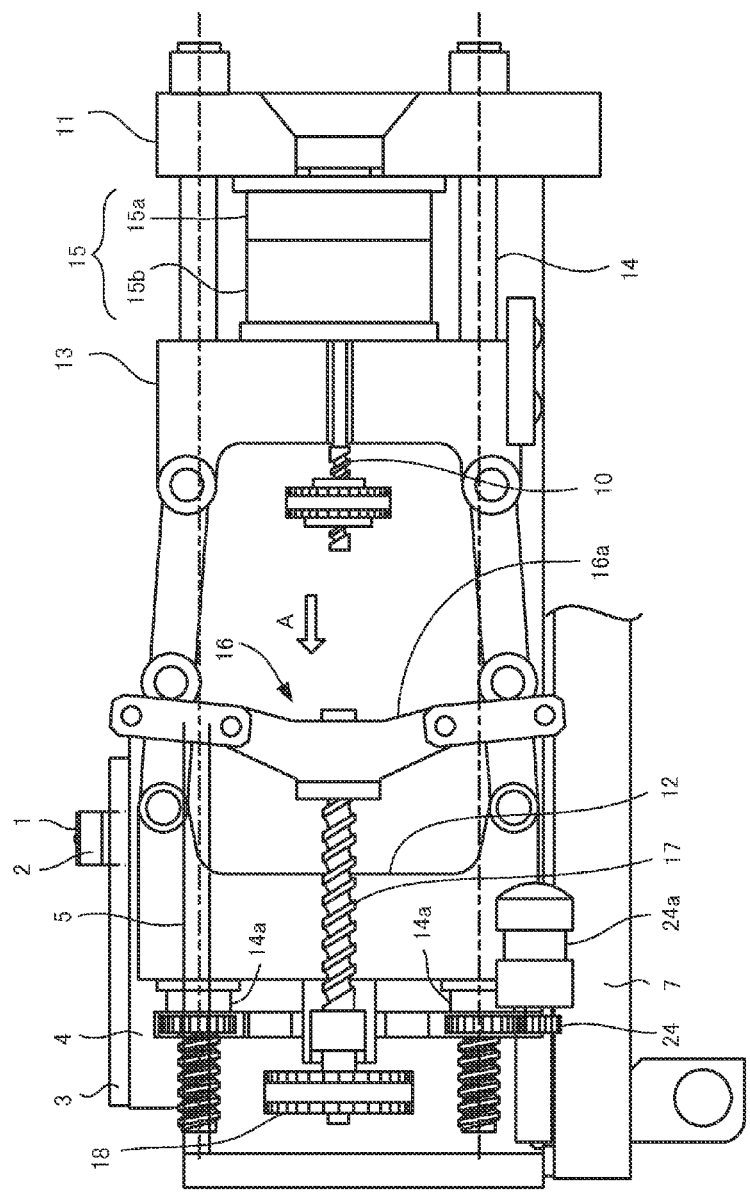
FIG. 1 is a schematic configuration view illustrating a die clamping device of an injection molding machine according to the invention, viewed from an operation side.
Figures 2, 3:
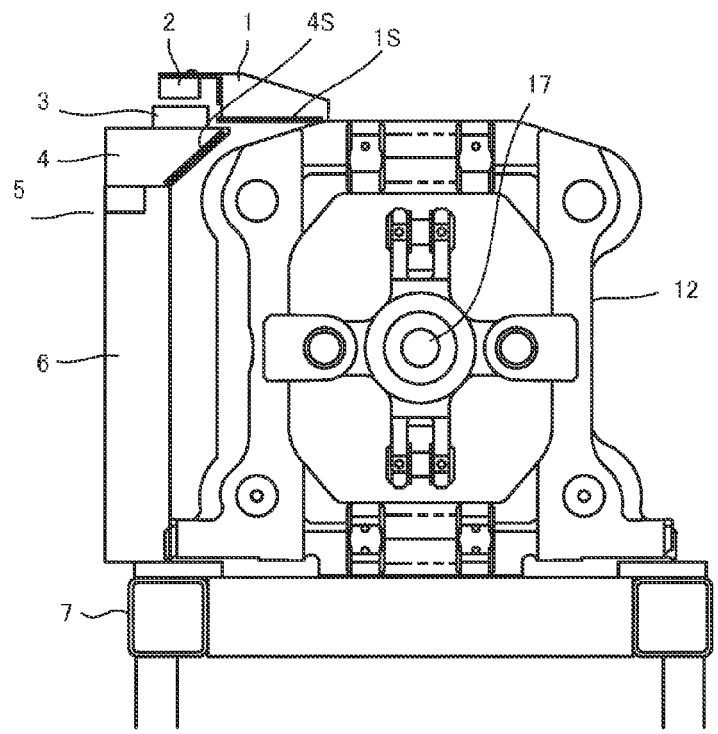
FIG. 2 is a view, viewed along the arrow A in FIG. 1.
FIG. 3 is a view illustrating a conventional technique of the die clamping device of the injection molding machine.

An embodiment of an injection molding machine according to the invention will be described with reference to FIGS. 1 and 2. The injection molding machine includes a position detector of the die clamping device.

The injection molding machine includes a die clamping unit and an injection unit on a machine frame 7. The die clamping unit includes a fixed platen 11, a rear platen 12, a movable platen 13, a toggle link mechanism 16, and the like. The injection unit is not illustrated in the drawings.

The die clamping unit will be described. The fixed platen 11 and the rear platen 12 are connected to each other by a plurality of tie-bars 14. The movable platen 13 is disposed between the fixed platen 11 and the rear platen 12 so as to be movable along a tie-bar 14. Further, a fixed-side die 15a is attached to the fixed platen 11, and a movable-side die 15b is attached to the movable platen 13. The die 15 includes the fixed-side die 15a and the movable-side die 15b.

The toggle link mechanism 16 is disposed between the rear platen 12 and the movable platen 13, and a nut which is provided in a cross head member 16a of the toggle link mechanism 16 is threaded into a ball screw 17 for driving die opening/closing mechanism which is attached to the rear platen 12 so as to be rotatable and immovable in the axial direction. A rotational driving force of a die clamping servo-motor (not illustrated) is transmitted to a pulley 18 provided in the ball screw 17 for driving die opening/closing mechanism.

The die clamping servo-motor drives the ball screw 17 for driving die opening/closing mechanism through a power transmission member such as the pulley 18, moves the cross head member 16a of the toggle link mechanism 16 forward or backward so that the movable platen 13 is moved (forward) toward the fixed platen 11 or is moved away (backward) from the fixed platen 11 using the toggle link mechanism 16, thereby closing, clamping, and opening the die 15 (the fixed-side die 15a and the movable-side die 15b).

The rear platen 12 is equipped with a die clamping force adjustment mechanism 24. The die clamping force adjustment mechanism 24 adjusts a die clamping force by driving a die clamping force adjustment motor 24a so as to rotate a nut 14a threaded into a screw provided in the tie-bar 14 through a transmission mechanism and then changing the position of the rear platen 12 with respect to the tie-bar 14 (that is, changing the position on the machine frame 7 with respect to the fixed platen 11). The die clamping device, the ejector mechanism, and the like which are provided in the injection molding machine are known in the prior art.

The invention relates to an injection molding machine including a position detector of a die opening/closing device, in which a shielding object is provided between the position detector and a scattering source of oil (for example, grease or the like) of the mechanical section of the injection molding machine to suppress contamination of the position detector. The oil scattering source is, for example, the ball screw 17 for driving die opening/closing mechanism or a ball screw 10 for driving molded article pushing mechanism. In case where the ball screw shaft of the ball screw 10 rotates, the ball screw shaft becomes an oil scattering source. In case where the ball nut of the ball screw 10 rotates, on the other hand, the ball nut becomes an oil scattering source. Then, in case where both the ball screw shaft and the ball nut rotate, both of them become the scattering sources.

A position detector (linear scale) body 3 is fixed onto a gate rail 5, which is fixed onto the machine frame 7 using a gate rail support member 6, by using a position detector body bracket 4. Further, a probe 2 of the position detector is provided in the rear platen 12 on the machine frame 7 by using a probe bracket 1 of the position detector. Thus, the position detector body bracket 4 (see reference numeral 4s in FIG. 2) mainly serves as a shielding object with respect to the oil scattering toward the position detector body 3, the probe bracket 1 of the position detector (see reference numeral 1s in FIG. 2) mainly serves as a shielding object with respect to the oil scattering toward the probe 2 of the position detector, thereby protecting the position detector from the contamination of the scattering oil. The gate rail 5 is used for a guide to an opening/closing gate (door).

Furthermore, in the embodiment, the position detector body 3 is provided on the gate rail 5, and the probe 2 of the position detector is provided on the rear platen 12. However, the probe 2 of the position detector may be provided on the gate rail 5, and the position detector body 3 may be provided on the rear platen 12.

As described above, the position detector of the embodiment includes the position detector body and the probe of the position detector. The position detector body is referred to as a detection target, and the probe of the position detector is referred to as a detection piece. In this specification, there is a case in which the "position detector" means the detection target or the detection piece or means both the detection target and the detection piece.

In the embodiment, the linear scale is used as the position detector, and linear scales of various types such as an optical type and a magnetic type may be used. Further, a position detector which detects magnetostriction by an ultrasonic wave or a position detector which uses a rack rail or a rotational encoder may be used as the position detector. Any position detector may be applied to the invention whether it is of digital type or analog type.

Further, in the invention, the die opening/closing device which acts as a target of which position is detected by the position detector is any one or both of the rear platen 12 and the movable platen 13. In the description of the above-described embodiment, the die opening/closing device which acts as a target of which position is detected by the position detector is the rear platen 12.

In the embodiment, the position detector is provided above the ball screw 17 for driving die opening/closing mechanism or the ball screw 10 for driving molded article pushing mechanism which acts as oil scattering sources, but the invention may be applied to a configuration in which the position detector is provided below the oil scattering source. Further, the invention may be applied regardless of the relative positional relation between the position detector and the oil scattering source.

In the injection molding machine of the invention, the shielding object is provided between the position detector which detects the position of the die opening/closing device on the machine frame and the oil scattering source of the mechanical section of the injection molding machine. The shielding target of the shielding object may be only the position detector body (the detection target) or only the probe of the position detector (the detection piece). Alternatively, the shielding target may be both the position detector body and the probe of the position detector.

Further, in the injection molding machine of the invention, the shielding object may also serve as a position detector fixing bracket. That is, the shielding object which is provided between the position detector body (the detection target) and the oil scattering source may serve as the bracket for fixing the position detector body (the detection target), the shielding object which is provided between the probe of the position detector (the detection piece) and the oil scattering source may serve as the bracket for fixing the probe of the position detector, the shielding object which is provided between the position detector body and the oil scattering source may serve as the bracket for fixing the position detector body, and the shielding object which is provided between the probe of the position detector and the oil scattering source may serve as the bracket for fixing the probe of the position detector.

Further, in the injection molding machine of the invention, the bracket for fixing one of the detection target and the detection piece constituting the position detector may be fixed to the gate rail. That is, in the case where the position detector body 3 is provided on the gate rail 5 and the probe 2 of the position detector is provided on the rear platen 12, the bracket for fixing the detection target is fixed to the gate rail 5, and the detection piece is provided in the rear platen 12 as the position detection target. Meanwhile, in the case where the probe 2 of the position detector is provided on the gate rail 5 and the position detector body 3 is provided in the rear platen 12, the bracket for fixing the detection piece is fixed to the gate rail 5, and the detection target is provided in the die opening/closing device as the position detection target.

The invention claimed is:

1. An injection molding machine including a position detector detecting a position of a die opening/closing device on a machine frame,
 wherein a shielding object is provided between the position detector and an oil scattering source of a mechanical section of the injection molding machine, and
 wherein the shielding object serves as a bracket for fixing the position detector.

2. The injection molding machine according to claim 1, further comprising:
 a gate rail fixed to the machine frame via a gate rail support member, the gate rail configured as a guide for an opening/closing gate,
 wherein the position detector comprises a detection target and a detection piece, and
 wherein the bracket for fixing one of the detection target and the detection piece is fixed to the gate rail.

3. The injection molding machine according to claim 1, wherein the die opening/closing device is a rear platen or a movable platen.

* * * * *